United States Patent
Saga et al.

(10) Patent No.: US 10,260,585 B2
(45) Date of Patent: Apr. 16, 2019

(54) BRAKE DISC AND MANUFACTURING METHOD THEREOF

(71) Applicants: RAILWAY TECHNICAL RESEARCH INSTITUTE, Tokyo (JP); NIPPON STEEL & SUMITOMO METAL CORPORATION, Tokyo (JP)

(72) Inventors: Shin-ichi Saga, Tokyo (JP); Yasushi Karino, Tokyo (JP); Kazutaka Asabe, Sanda (JP); Atsushi Sakaguchi, Nishinomiya (JP); Mikio Yoneyama, Osaka (JP); Yoshihiro Tatsumi, Kobe (JP)

(73) Assignees: RAILWAY TECHNICAL RESEARCH INSTITUTE, Tokyo (JP); NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/917,888

(22) PCT Filed: Sep. 12, 2014

(86) PCT No.: PCT/JP2014/074328
§ 371 (c)(1),
(2) Date: Mar. 9, 2016

(87) PCT Pub. No.: WO2015/037731
PCT Pub. Date: Mar. 19, 2015

(65) Prior Publication Data
US 2016/0223041 A1 Aug. 4, 2016

(30) Foreign Application Priority Data
Sep. 13, 2013 (JP) .................................. 2013-191081

(51) Int. Cl.
*F16D 65/12* (2006.01)
*F16D 69/02* (2006.01)
(Continued)

(52) U.S. Cl.
CPC .......... *F16D 69/027* (2013.01); *B22F 3/1055* (2013.01); *B22F 7/08* (2013.01);
(Continued)

(58) Field of Classification Search
CPC .. F16D 65/12; F16D 65/127; F16D 2065/132; F16D 69/027; F16D 2200/0043; B23K 26/342
(Continued)

(56) References Cited

U.S. PATENT DOCUMENTS 5,612,110 A * 3/1997 Watremez ............. F16D 65/123
188/251 R
5,629,101 A 5/1997 Watremez
(Continued)

FOREIGN PATENT DOCUMENTS

FR 2717875 A1 9/1995
JP 5-305479 A 11/1993
(Continued)

OTHER PUBLICATIONS

International Search Report for PCT/JP2014/074328 dated Dec. 16, 2014.
(Continued)

*Primary Examiner* — Thomas W Irvin
(74) *Attorney, Agent, or Firm* — Birch, Stewart, Kolasch & Birch, LLP

(57) ABSTRACT

A brake disc of the present invention is a brake disc that stops the rotation of an axle when a brake pad is pressed on a surface of the brake disc, including a disc main body that is attached to a rotary body integrally rotating with the axle;
(Continued)

and a plurality of build-up layers laminated on a surface of the disc main body, in which the build-up layers are laminated on the surface of the disc main body by means of laser metal deposition welding.

8 Claims, 8 Drawing Sheets

(51) Int. Cl.
| | |
|---|---|
| *B61H 5/00* | (2006.01) |
| *B23K 26/14* | (2014.01) |
| *B22F 3/105* | (2006.01) |
| *B22F 7/08* | (2006.01) |
| *B23K 26/34* | (2014.01) |
| *B23K 26/348* | (2014.01) |
| *F16D 65/02* | (2006.01) |
| *B33Y 10/00* | (2015.01) |
| *B33Y 80/00* | (2015.01) |

(52) U.S. Cl.
CPC .......... *B23K 26/1476* (2013.01); *B23K 26/34* (2013.01); *B23K 26/348* (2015.10); *B61H 5/00* (2013.01); *F16D 65/124* (2013.01); *F16D 65/127* (2013.01); *B33Y 10/00* (2014.12); *B33Y 80/00* (2014.12); *F16D 2065/132* (2013.01); *F16D 2065/138* (2013.01); *F16D 2200/0013* (2013.01); *F16D 2200/0026* (2013.01); *F16D 2200/0043* (2013.01); *F16D 2250/0053* (2013.01); *F16D 2250/0076* (2013.01)

(58) Field of Classification Search
USPC .................................................. 188/218 XL
See application file for complete search history.

(56) References Cited

U.S. PATENT DOCUMENTS

| | | | | |
|---|---|---|---|---|
| 5,878,843 A | * | 3/1999 | Saum ................. | F16D 65/0006 188/218 A |
| 5,901,818 A | | 5/1999 | Martino | |
| 7,666,522 B2 | * | 2/2010 | Justin ................. | A61F 2/30767 148/525 |
| 7,951,412 B2 | * | 5/2011 | Justin ................. | A61F 2/30767 148/525 |
| 8,084,089 B2 | * | 12/2011 | Meckel ................ | C23C 14/025 427/255.7 |
| 8,449,943 B2 | * | 5/2013 | Meckel ................ | C23C 14/022 204/192.15 |
| 9,126,287 B2 | * | 9/2015 | Bruck .................... | B23K 9/042 |
| 2004/0146640 A1 | * | 7/2004 | Ott ............................ | B22F 9/28 427/180 |
| 2005/0087406 A1 | * | 4/2005 | Meckel ................... | F16D 65/12 188/71.1 |
| 2007/0202351 A1 | | 8/2007 | Justin et al. | |
| 2008/0178994 A1 | * | 7/2008 | Qi ......................... | B22F 3/1055 156/245 |
| 2012/0097645 A1 | * | 4/2012 | Clark .................. | B23K 15/0006 219/121.14 |
| 2012/0213659 A1 | * | 8/2012 | Bayer ................... | B22F 3/1055 419/53 |
| 2013/0140279 A1 | * | 6/2013 | Bruck .................... | B23K 26/34 219/73.11 |
| 2015/0047935 A1 | * | 2/2015 | Godfrey ................. | F16F 9/103 188/298 |
| 2015/0354647 A1 | * | 12/2015 | Tironi .................... | F16D 65/12 188/218 XL |
| 2015/0369314 A1 | * | 12/2015 | Filip ....................... | C23C 14/34 188/218 XL |
| 2016/0175929 A1 | * | 6/2016 | Colin ................. | C04B 35/62839 419/23 |
| 2016/0263833 A1 | * | 9/2016 | Vittitow ................ | B22F 3/1055 |
| 2016/0265362 A1 | * | 9/2016 | Slavens .................. | B22F 5/04 |
| 2016/0290423 A1 | * | 10/2016 | Tironi .................... | F16D 65/12 |
| 2016/0332416 A1 | * | 11/2016 | Troester ................... | B32B 5/02 |
| 2016/0341044 A1 | * | 11/2016 | Heason .................. | F01D 11/00 |
| 2016/0370007 A1 | * | 12/2016 | Hongoh ................. | F23R 3/002 |

FOREIGN PATENT DOCUMENTS

| | | |
|---|---|---|
| JP | 2007-162779 A | 6/2007 |
| JP | 2009-63072 A | 3/2009 |
| JP | 2012-176422 A | 9/2012 |
| JP | 2012-233530 A | 11/2012 |
| TW | 281654 B | 7/1996 |

OTHER PUBLICATIONS

Written Opinion of the International Searching Authority for PCT/JP2014/074328 dated Dec. 16, 2014.
Korean Notice of Preliminary Rejection and English translation thereof, dated Mar. 22, 2016, for counterpart Korean Application No. 10-2016-7006405.
Taiwanese Office Action and Search Report, dated Apr. 26, 2016, for counterpart Taiwanese Application No. 103131671, with an English translation.
European Patent Office Search Report dated Aug. 7, 2017 for EPO Application No. 14843625.6.

* cited by examiner

FIG. 2
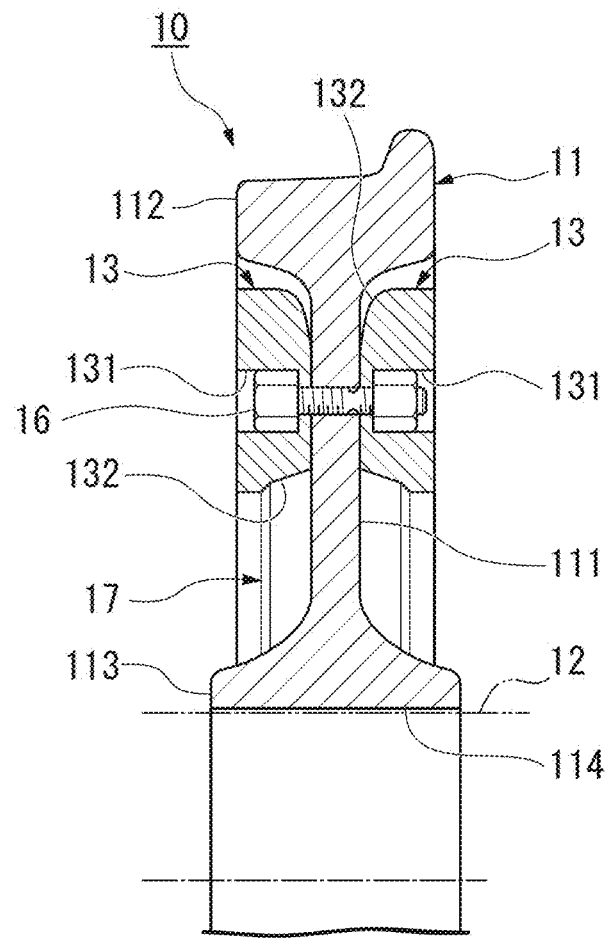
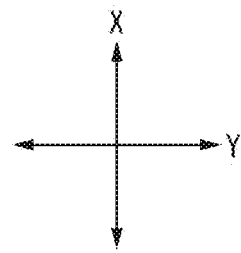

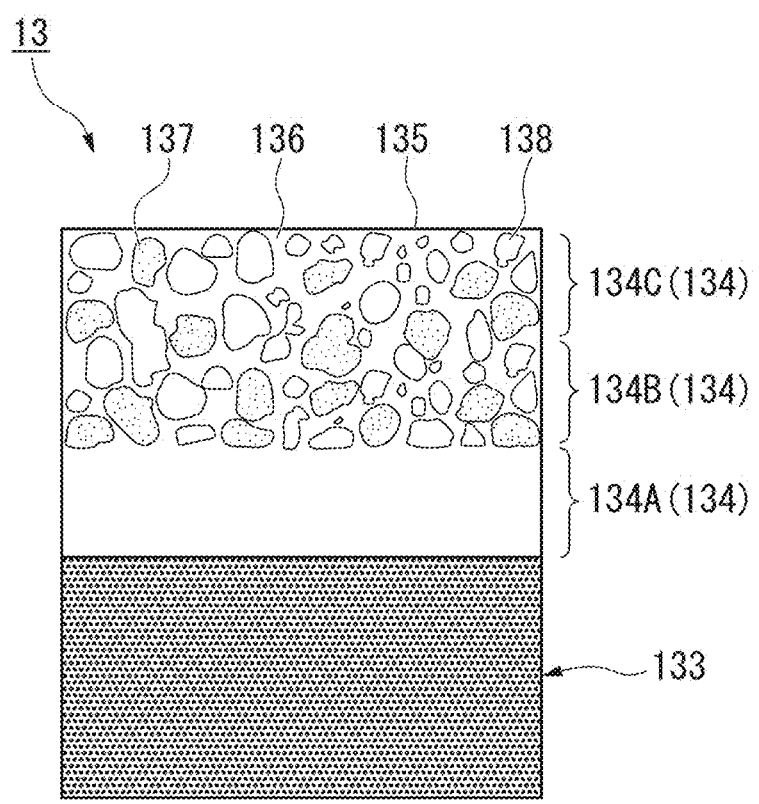

FIG. 5

WELDING CONDITIONS

| LASER RADIATION CONDITIONS | | | WELDING MATERIAL SUPPLY CONDITIONS | | | OTHER CONDITIONS | |
|---|---|---|---|---|---|---|---|
| FOCAL DIAMETER (mm) | MFO (V) | OUTPUT (W) | SHIELD GAS (L/min) | ROTATION SPEED (rpm) | CARRIER GAS (L/min) | WELDING SPEED (mm/min) | PITCH WIDTH (mm) |
| 5.4 | 0.45 | 2700 | 15 | 10 | 4 | 500 | 2.3 |

FIG. 6

CHARACTERISTIC COMPARISON BY WELDING METHODS

| | PLASMA THERMAL SPRAYING | LMD WELDING | PTA WELDING |
|---|---|---|---|
| BUILD-UP THICKNESS (mm) | 0.05~0.5 | 0.1~2 | 0.5~3 |
| BUILD-UP AMOUNT (kg/hr) | 5~9 | <1 | <2 |
| THERMAL LOAD | EXTRMELEY LOW | LOW | HIGH |
| MOLTEN AMOUNT (%) | 0 | <5 | 10~20 |
| ADHERING FORCE (Mpa) | 80 | 800 | 800 |
| YIELD (%) | 10~20 | 80~90 | 80~90 |
| POROSITY (%) | 1~3 | 0 | 0 |

BUILD-UP WELDING OF CERAMIC (ALUMINA)

APPEARANCE AND LIQUID PENETRANT INSPECTION RESULT
AFTER LASER METAL DEPOSITION WELDING

BRAKE DISC AND MANUFACTURING METHOD THEREOF

TECHNICAL FIELD OF THE INVENTION

The present invention relates to a brake disc and a manufacturing method thereof.

Priority is claimed on Japanese Patent Application No. 2013-191081, filed on Sep. 13, 2013, the content of which is incorporated herein by reference.

RELATED ART

In a wheel or an axle of a railroad vehicle such as the Shinkansen, a brake disc is provided in order to obtain a braking force by pressing a brake pad thereon. Here, the brake disc has a problem of being cracked or distorted due to an influence of heat generated during braking. Therefore, a brake disc is proposed in which the surface of a disc main body of the brake disc is coated with a material having excellent heat-resisting properties, whereby cracking or distortion generated due to brake heat can be suppressed.

For example, in a brake disc disclosed in Patent Document 1, first, a blast treatment is carried out on the surface of the disc main body. That is, particles made of an inorganic material are sprayed onto the surface of the disc main body at a predetermined pressure, whereby an unevenly roughened layer is formed on the surface of the disc main body. In addition, a metallic bond layer is formed on the surface of the roughened layer, and then a ceramic having excellent heat-resisting properties and toughness such as zirconia is thermally sprayed onto the surface of the metallic bond layer, whereby a heat-resisting coating layer is formed on the surface of the metallic bond layer. According to the above-described constitution of the brake disc, since the conduction of heat generated during braking to the disc main body is reduced due to the heat-resisting coating layer, the generation of cracking or distortion of the disc main body is suppressed.

In this surface treatment technique for improving the thermal crack resistance of a brake disc which is disclosed in Patent Document 1, the disc main body and the heat-resisting coating layer are strongly bonded together through the roughened layer and the metallic bond layer. Therefore, the bonding strength between the disc main body and the heat-resisting coating layer in the surface treatment technique disclosed in Patent Document 1 improves compared with surface treatment techniques of the related art such as a thermal spraying method or a plating method, but is still insufficient in a braking environment (high-speed rotation, oscillatory load, and high temperature) during high-speed travelling.

Meanwhile, as a technique of the related art for suppressing thermal cracks generated when a friction surface of the brake disc is cooled, there is a brake disc (clad disc) having a cast iron material fused to the surface of the disc main body, but there has been a problem of a low adhesion strength between the disc main body and the cast iron layer. In addition, the forged steel brake disc of the related art has heat-resisting properties and crack resistance, but is not subjected to any surface treatments. Therefore, the forged steel brake disc of the related art has a problem of being susceptible to heat generated during braking.

Patent Document 2 discloses a manufacturing method of a brake disc for solving the above-described problem of heat influence.

In the manufacturing method of a brake disc disclosed in Patent Document 2, a surface treatment is carried out by means of welding, and plasma transferred arc welding (PTA welding) is carried out on the surface of the disc main body in order to alleviate heat influence represented by thermal cracking.

Specifically, in the manufacturing method of a brake disc disclosed in Patent Document 2, a brake disc is manufactured by laminating a plurality of layers of a welding material obtained by dispersing high-melting-point metal particles having a higher melting point than the disc main body in a matrix material on the surface of the disc main body that is attached to a rotary body integrally rotating with an axle by means of PTA welding.

PRIOR ART DOCUMENT

Patent Document

[Patent Document 1] Japanese Unexamined Patent Application, First Publication No. 2009-63072

[Patent Document 2] Japanese Unexamined Patent Application, First Publication No. 2012-233530

DISCLOSURE OF THE INVENTION

Problems to be Solved by the Invention

However, in the PTA welding disclosed in Patent Document 2, preheating becomes necessary during welding, and thermal strain is generated due to the disc main body reaching an extremely high temperature, and thus the disc main body distorts. Therefore, there is a problem in that it is necessary to carry out a pretreatment in order to provide an inverse taper shape to the disc main body prior to welding.

In addition, in the PTA welding disclosed in Patent Document 2, since a welding subject further thermally distorts as the size or length thereof increases, it is difficult to thin the disc main body.

In addition, in a case in which PTA welding is employed, the disc main body melts into a build-up layer due to high-temperature plasma (the molten amount is in a range of 10% to 20%). As a result, a problem of degradation of the strength and functionality of the build-up layer or a new problem of the generation of poor welding results such as beads, blowholes, or pits having irregular shapes is caused.

In addition, in order to form a build-up layer on the surface of the disc main body by means of PTA welding, it is necessary to generate high-temperature arc discharge, and thus there is another problem of an increase in running costs.

The present invention has been made in consideration of the above-described circumstances, and an object of the present invention is to provide a brake disc which is capable of reducing the thickness of a disc main body and is capable of preventing the degradation of strength and functionality of a build-up layer, and a manufacturing method thereof.

Means for Solving the Problem

In order to solve the above-described problems and achieve the object, the present invention employs the following means.

(1) According to a first aspect of the present invention, there is provided a brake disc that stops rotation of an axle when a brake pad is pressed on a surface of the brake disc, including a disc main body that is attached to a rotary body integrally rotating with the axle; and a plurality of build-up layers laminated on a surface of the disc main body, in which the build-up layers are laminated on the surface of the disc main body by means of laser metal deposition welding.

(2) In the brake disc according to (1), the build-up layer may be constituted of a laminate formed of two or more layers of a predetermined matrix laminated on the surface of the disc main body, and the laminate may include an inner layer which is laminated on the disc main body and does not include high-melting-point metal particles having a higher melting point than the disc main body and an outer layer which is formed on the inner layer and includes the high-melting-point metal particles.

(3) In the brake disc according to (2), the high-melting-point metal particles may include molybdenum, tungsten, niobium, or tantalum, or a combination thereof.

(4) In the brake disc according to (2) or (3), the outer layer of the build-up layer may further include ceramic particles; and an amount of the ceramic particles in the outer layer may be higher than 0% and 50% or lower in terms of % by mass.

(5) According to an aspect of the present invention, there is provided a manufacturing method of a brake disc that stops rotation of an axle when a brake pad is pressed on a surface of the brake disc, including a build-up layer-forming step of forming a build-up layer on a surface of a disc main body that is attached to a rotary body integrally rotating with the axle by means of laser metal deposition welding.

(6) In the manufacturing method of a brake disc according to (5), the build-up layer-forming step may include a first step of forming an inner layer of the build-up layer on the surface of the brake main body by radiating laser beams on the surface of the disc main body and supplying a first metal powder to a position irradiated with the laser beams so as to melt the first metal powder; and a second step of forming an outer layer of the build-up layer on a surface of the inner layer by radiating laser beams on the surface of the inner layer and supplying a second metal powder to a position irradiated with the laser beams so as to melt the second metal powder. In addition, the first metal powder may be particles of a predetermined matrix, and the second metal powder may be a powder mixture of the particles of the matrix and high-melting-point metal particles having a melting point higher than a melting point of the disc main body.

(7) In the manufacturing method of a brake disc according to (5) or (6), the high-melting-point metal particles may include molybdenum, tungsten, niobium, or tantalum, or a combination thereof.

(8) In the manufacturing method of a brake disc according to any one of (5) to (7), the second metal powder may be a powder mixture of the particles of the matrix, the high-melting-point metal particles, and ceramic particles; and an amount of the ceramic particles in the second metal powder may be higher than 0% and 50% or lower in terms of % by mass.

Effects of the Invention

In the above-described aspect, since the build-up layer is laminated on the disc main body using laser metal deposition welding (LMD welding) in which a thermal influence is smaller than in PTA welding of the related art, preheating that is required in PTA welding of the related art is unnecessary, thermal strain generated during welding is suppressed, and thus it is possible to suppress the distortion of the disc main body. As a result, according to the above-described aspect, it is possible to reduce the thickness of the disc main body.

In addition, in the above-described aspect, since LMD welding having a smaller thermal influence than PTA welding is used, it is also possible to prevent the disc main body from melting into the build-up layer. As a result, according to the above-described aspect, it is possible to prevent the degradation of the strength and functionality of the build-up layer. In addition, since it is also possible to suppress the generation of poor welding results such as beads, blowholes, or pits having irregular shapes in the build-up layer, it becomes possible to further prevent a decrease in the strength of the build-up layer.

In addition, in the above-described aspect, since the build-up layer is laminated on the disc main body using LMD welding having a smaller thermal influence than PTA welding of the related art, it is possible to use ceramic particles having a relatively low melting point (for example, alumina) as the particles that are dispersed in the build-up layer.

In addition, in the above-described aspect, since the inner layer (the first layer) of the build-up layer laminated on the disc main body does not include any high-melting-point metal particles, it is possible to enhance adhesion between the build-up layer and the disc main body. In addition, since the high-melting-point metal particles in the outer layer (the second layer and the third layer) of the build-up layer remain in the outer layer as metal particles even after welding, it is possible to impart strong heat-resisting properties to the disc main body and to prevent the build-up layer from cracking after welding.

Furthermore, in the above-described aspect, a welding material obtained by dispersing high-melting-point metal particles having a higher melting point than the disc main body is laminated on the surface of the disc main body that is attached to a rotary body integrally rotating with an axle by means of LMD welding. According to the above-described aspect, quenching of the disc main body due to friction heat generated during braking while travelling is suppressed due to the build-up layer formed on the disc main body using LMD welding, and thus it is possible to suppress the generation of cracking or distortion on the surface of the disc main body and to impart both heat-resisting properties and thermal crack resistance to the brake disc.

BRIEF DESCRIPTION OF THE DRAWINGS

FIG. 2 is a schematic sectional view showing an A-A line cross-section in FIG. 1.

FIG. 3 is a schematic cross-sectional view showing a vicinity of a surface of the brake disc according to the present embodiment.

FIG. 5 is a table showing welding conditions of the LMD welding apparatus.

FIG. 6 is a table showing the characteristic comparison results between LMD welding, PTA welding, and plasma thermal spraying.

EMBODIMENTS OF THE INVENTION

Hereinafter, an embodiment of the present invention will be described with reference to the accompanying drawings.

Figure 1:
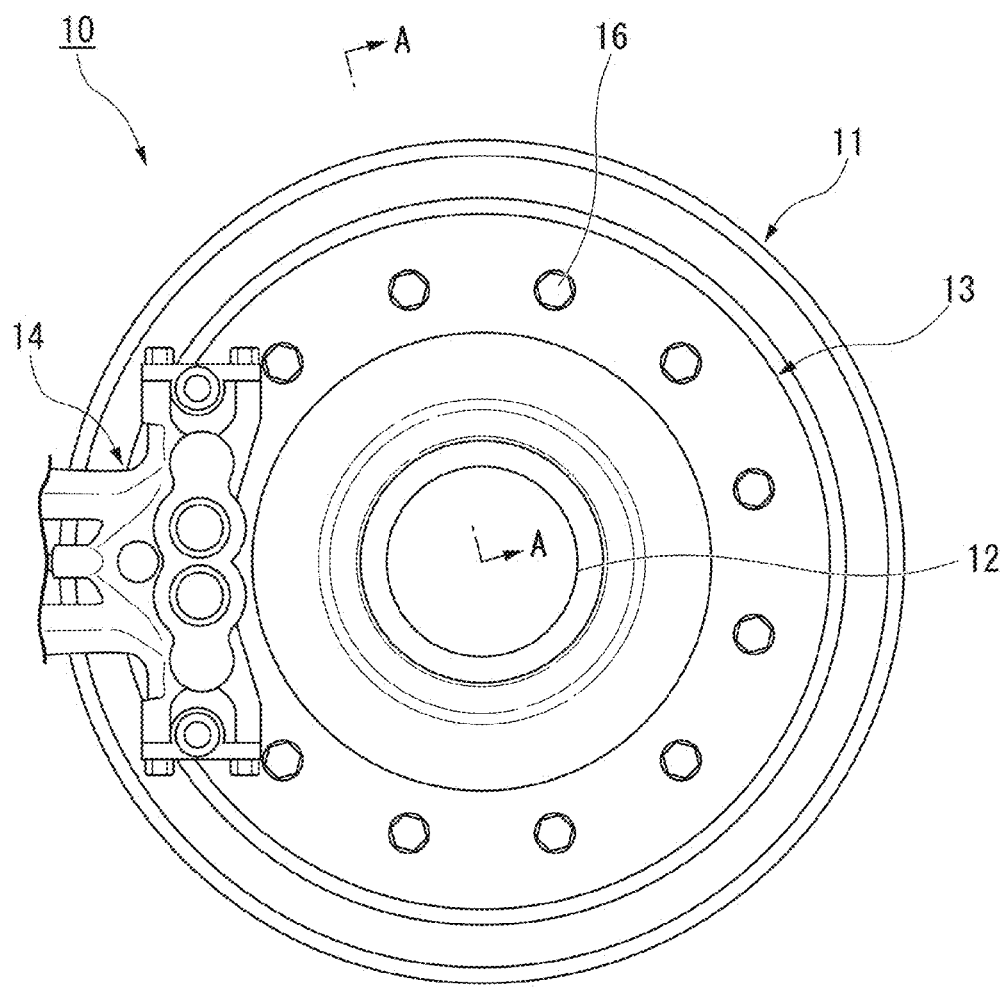
FIG. 1 is a schematic front view showing an appearance of a Shinkansen braking apparatus including a brake disc according to an embodiment of the present invention.

FIG. 1 is a schematic front view showing the appearance of a Shinkansen braking apparatus 10 including a brake disc 13 according to the present embodiment. In addition, FIG. 2 is a schematic cross-sectional view showing an A-A line cross-section in FIG. 1.

As shown in FIG. 1, the Shinkansen braking apparatus 10 includes a substantially round wheel 11 (rotary body), an axle 12 inserted into the wheel 11, a brake disc 13 attached to the end surface of the wheel 11, and a brake pad 14 disposed close to the brake disc 13.

As shown in FIGS. 1 and 2, the wheel 11 includes a flat plate part 111 having a constant thickness in an axial direction Y of the wheel 11, a rim part 112 which is provided at the outer edge part of the flat plate part 111 in a radial direction X of the wheel 11 and has a thickness in the axial direction Y thicker than that of the flat plate part 111, a boss part 113 which is provided at the central part of the flat plate part 111 in the radial direction X of the wheel 11 and has a thickness in the axial direction Y thicker than those of the flat plate part 111 and the rim part 112, and an axis insertion hole 114 penetrating the boss part 113 in the axial direction Y.

As shown in FIGS. 1 and 2, the axle 12 is inserted into the axis insertion hole 114 of the wheel 11 and is fixed to the wheel 11. When the axle 12 is rotary-driven using a driving apparatus (a motor or the like), not shown, the wheel 11 and the axle 12 rotate integrally with each other.

The brake disc 13 plays a role of obtaining a braking force when the brake pad 14 is pressed thereon. As shown in FIG. 1, the brake disc 13 is a flat plate member having a substantially circular ring shape. The outer diameter of the brake disc 13 is smaller than the inner diameter of the rim part 112 of the wheel 11. The inner diameter of the brake disc 13 is larger than the outer diameter of the boss part 113 of the wheel 11. In addition, as shown in FIG. 2, the thickness of the brake disc 13 is substantially equal to the protruding height of the rim part 112 with respect to the flat plate part 111 of the wheel 11. Furthermore, as shown in FIGS. 1 and 2, in the brake disc 13, a plurality of bolt insertion holes 131 are formed at predetermined intervals along the circumferential direction.

FIG. 3 is a schematic cross-sectional view showing a vicinity of the surface of the brake disc 13. The brake disc 13 includes a disc main body 133 and a build-up layer 134 formed on the surface of the disc main body 133 by means of laser metal deposition welding (LMD welding).

The disc main body 133 is the main body of the brake disc 13 obtained by forming forged steel, which is a steel product for forging, in a circular ring shape. Meanwhile, the material of the disc main body 133 is not limited to forged steel and may be carbon steel having excellent cost performance or pearlitic cast iron having excellent heat conducting properties and wear resistance.

The build-up layer 134 is constituted of a laminate made up of a first build-up layer 134A laminated on the surface of the disc main body 133 by means of melt bonding, a second build-up layer 134B laminated on the surface of the first build-up layer 134A by means of melt bonding, and a third build-up layer 134C laminated on the surface of the second build-up layer 134B by means of melt bonding.

Meanwhile, in the build-up layer 134 (134A to 134C) on the disc main body 133, the first build-up layer 134A forms an inner layer, and the second build-up layer 134B and the third build-up layer 134C form an outer layer.

In addition, the surface of the third build-up layer 134C located at the uppermost part serves as a friction surface 135 which is pressed by the brake pad 14. Meanwhile, as shown in FIG. 3, a uniform integrated structure with no microstructural changes is formed between the respective build-up layers 134A to 134C due to melt bonding by means of welding.

As shown in FIG. 3, the first build-up layer 134A is a layer formed of a predetermined matrix 136. The Vickers hardness of the first build-up layer 134A is 220 [Hv] or higher and 270 [Hv] or lower. The thickness of the first build-up layer 134A is in a range of 1 [mm] to 5 [mm].

The matrix 136 is, for example, a nickel-based alloy. Examples of the nickel-based alloy include HASTELLOY (registered trademark) C alloy. Here, HASTELLOY C alloy refers to an alloy respectively containing, as chemical components, chromium (Cr): 15%, molybdenum (Mo): 16%, and tungsten (W): 4% in terms of % by mass with a remainder of nickel (Ni). Meanwhile, the matrix 136 is not limited to the nickel-based alloy, and a material having high thermal conductivity such as copper and a copper alloy such as aluminum bronze, silver and a silver alloy, or aluminum or an aluminum alloy may be used as the matrix 136.

The first build-up layer 134A initially laminated on the surface of the disc main body 133 does not include high-melting-point metal particles described below. Therefore, it is possible to enhance adhesion between the first build-up layer 134A and the disc main body 133.

As shown in FIG. 3, the second build-up layer 134B and the third build-up layer 134C are layers formed of the matrix 136 and contain high-melting-point metal particles 137 having a melting point higher than the melting point of the disc main body 133. The matrix 136 in the second build-up layer 134B and the third build-up layer 134C plays a role of homogeneously bonding the high-melting-point metal particles 137. The Vickers hardness of the second build-up layer 134B and the third build-up layer 134C is 220 [Hv] or higher and 270 [Hv] or lower. Here, in the second build-up layer 134E and the third build-up layer 134C, only the high-melting-point metal particles 137 may be dispersed in the matrix 136. However, in the present embodiment, the second build-up layer 134B and the third build-up layer 134C include hard ceramic particles 138 (for example, alumina particles) together with the high-melting-point metal particles 137. The amount of the hard ceramic particles 138 in the second build-up layer 134B and the third build-up layer 134C is higher than 0% and 50% or lower in terms of % by mass.

In the field of build-up welding, since it is necessary to suppress the friction coefficient of the surface of the build-up layer at an extremely low level, it is usual not to add ceramic particles to the build-up layer. However, in the present embodiment, in order to obtain a braking force required for the brake disc 13, the hard ceramic particles 138 are added to the second build-up layer 134B and the third build-up layer 134C. From the viewpoint of the average friction coefficient, the wear amount, and the suppression of grain boundary exfoliation between the ceramic particles 138 and the matrix 136, the amount of the hard ceramic particles 138 in the second build-up layer 134B and the third build-up layer 134C is preferably higher than 0% and 50% or lower.

The second build-up layer 134B constituted as described above is laminated on the surface of the first build-up layer 134A, and the third build-up layer 134C is laminated on the surface of the second build-up layer 134B, respectively, in a thickness in a range of approximately 1 mm to 5 mm. Meanwhile, basically, the third build-up layer 134C has the same constitution as the second build-up layer 134B.

The high-melting-point metal particles 137 play a role of imparting strong heat-resisting properties to the disc main body 133. The high-melting-point metal particles 137 are particles of a metal having a higher melting point compared with the disc main body 133 and include molybdenum (Mo), tungsten (W), niobium (Nb), or tantalum (Ta), or a combination thereof.

The amount of the high-melting-point metal particles 137 in the second build-up layer 134E and the third build-up layer 134C is higher than 0% and 80% or lower in terms of % by mass.

In addition, among the high-melting-point metal particles 137, particles having an average grain size of 75 μm or larger and 100 μm or smaller account for 70% to 80% of the total number of the particles, and particles having an average grain size of 10 μm or larger and 45 μm or smaller account for the remainder.

As shown in FIG. 2, the brake disc 13 constituted as described above is disposed on the flat plate part 111 of the wheel 11 in a state in which a side on which a notch part 132 is formed faces the wheel 11 side and is fixed to the wheel 11 using a fixing bolt 16 inserted into the bolt insertion hole 131.

In addition, as described above, the outer diameter of the brake disc 13 is smaller than the inner diameter of the rim part 112. The inner diameter of the brake disc 13 is larger than the outer diameter of the boss part 113.

Therefore, as shown in FIG. 2, a gap 17 having a predetermined width is formed between the brake disc 13 and the boss part 113 in a state in which the brake disc 13 is fixed to the flat plate part 111 of the wheel 11.

As shown in FIG. 1, the brake pad 14 is provided at a location opposite to the brake disc 13 in the radial direction X of the wheel 11. Although not shown in detail, the brake pad 14 is provided so as to be capable of moving in the axial direction Y of the wheel 11. When the brake pad 14 is moved toward the brake disc 13, the friction surface 135 (the surface of the third build-up layer 134C) of the brake disc 13 is pressed by the brake pad 14. In such a case, a braking force that stops the axle 12 which integrally rotates with the brake disc 13 is generated. On the other hand, when the brake pad 14 is separated from the brake disc 13, the rotation of the axle 12 is allowed.

Next, the effect of the brake disc 13 according to the present embodiment will be described. In the brake disc 13 according to the present embodiment, the build-up layer 134 is laminated on the surface of the disc main body 133 by means of LMD welding. Therefore, in the boundary surface between the disc main body 133 and the first build-up layer 134A, the adhesion strength between the disc main body 133 and the first build-up layer 134A improves due to melt bonding. Therefore, in a braking environment during high-speed travelling, it is possible to prevent the build-up layer 134 from being exfoliated from the surface of the disc main body 133.

In addition, the Vickers hardness of the build-up layer 134 is 220 [Hv] or higher and 270 [Hv] or lower. As described above, the Vickers hardness of the build-up layer 134 is below 350 [Hv] which is a Vickers hardness that serves as a general rough standard determining whether cracks initiate and propagate. Therefore, even in a braking environment during high-speed travelling, cracking or distortion does not easily occur in the build-up layer 134.

In addition, high toughness is imparted to the disc main body 133 by means of a heat treatment during the manufacturing thereof. During the lamination of the first build-up layer 134A, when heat generated from LMD welding (heat generated by laser beams striking the disc main body 133) is applied to the disc main body 133, a quenched layer (not shown) is generated, and thus the disc main body 133 is hardened.

Meanwhile, during the lamination of the second build-up layer 134B, since heat generated due to LMD welding is transferred to the disc main body 133 through the first build-up layer 134A, the amount of heat transferred to the disc main body 133 decreases. Therefore, the quenched layer generated during the lamination of the first build-up layer 134A is tempered due to the heat applied during the lamination of the second build-up layer 134B. Therefore, toughness is imparted to the hardened disc main body 133.

Furthermore, during the lamination of the third build-up layer 134C, since heat generated due to LMD welding is transferred to the disc main body 133 through the second build-up layer 134B and the first build-up layer 134A, the amount of heat transferred to the disc main body 133 further decreases. Therefore, similar to the above-described case, the quenched layer generated during the lamination of the first build-up layer 134A is tempered, and thus the toughness of the disc main body 133 further improves. As a result, even in a braking environment during high-speed travelling, cracking or distortion does not easily occur in the disc main body 133.

Meanwhile, after the beginning of the use of the brake disc 13, since the quenched layer generated in the disc main body 133 is further tempered due to heat generated during braking, the crack resistance of the disc main body 133 further improves.

Next, an LMD welding apparatus 20 which is used to laminate the build-up layer 134 on the surface of the disc main body 133 will be described with reference to FIGS. 4A and 4B.

Figure 4A:
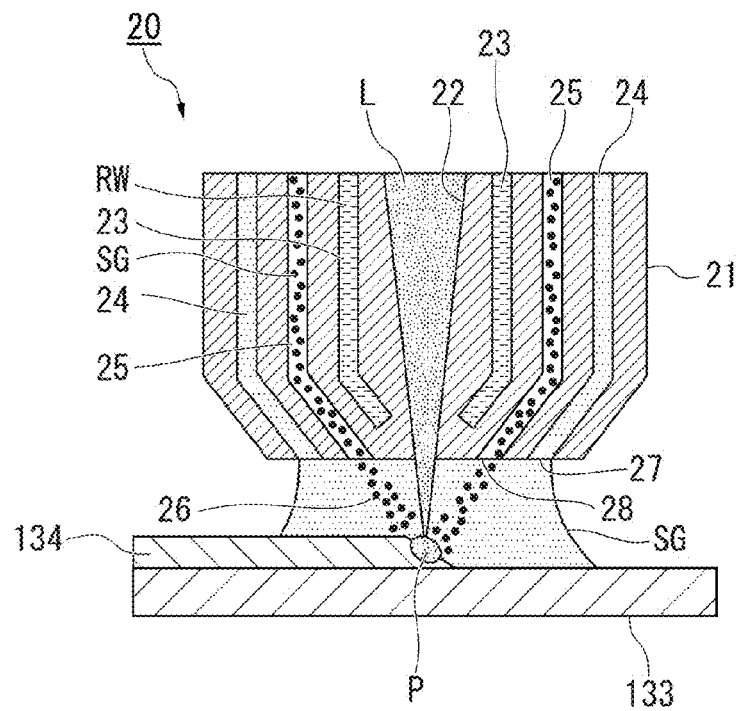
FIG. 4A is a schematic constitutional view of an LMD welding apparatus that is used to form a build-up layer in the present embodiment.

Meanwhile, FIG. 4A is a front cross-sectional view of the LMD welding apparatus 20 in the present embodiment. FIG. 4B is a front sectional view of a PTA welding apparatus 30 shown as a comparative example.

As shown in FIG. 4A, the LMD welding apparatus 20 in the present embodiment includes a welding torch 21, a central hole 22 which is formed in the central part of the welding torch 21 and through which a laser beam L supplied from a laser oscillator (not shown) passes, and a cooling water supply path 23, a shield gas supply path 24, and a welding material supply path 25 which are respectively formed in a concentric shape around the central hole 22.

The cooling water supply path 23 is disposed outside the central hole 22 and serves as a flow path through which cooling water RW is supplied.

The shield gas supply path 24 and the welding material supply path 25 are disposed so as to be adjacent to each other outside the cooling water supply path 23. A shield gas SG is supplied to the shield gas supply path 24. A welding material 26 (metal powder) is supplied to the welding material supply path 25. A nozzle 27 is provided at the tip of the shield gas supply path 24, and the shield gas SG is sprayed toward the surface of the disc main body 133 from the nozzle 27. A nozzle 28 is provided at the tip of the welding material supply path 25, and the welding material 26 is sprayed toward the surface of the disc main body 133 from the nozzle 28.

The details will be described below; however, in a case in which the first build-up layer 134A is formed, a first metal powder that is particles of the matrix 136 is used as the welding material 26. In addition, in a case in which the second build-up layer 134B and the third build-up layer 134C are formed, a second metal powder that is the powder mixture of the particles of the matrix 136, the high-melting-point metal particles 137, and the hard ceramic particles 138 is used as the welding material 26.

The above-described welding material 26 is transported using a carrier gas CG which flows through the welding material supply path 25.

In addition, as the carrier gas CG, an inert gas such as argon gas or helium gas is used. In addition, the oxidation of the disc main body 133 and the build-up layer 134 is prevented due to the shield gas SG supplied to the shield gas supply path 24.

In the LMD welding apparatus 20 constituted as described above, the laser beam L is radiated on the surface of the disc main body 133 from the welding torch 21, and the welding material 26 (the first metal powder or the second metal powder) is supplied to a laser irradiation position (a position indicated with a reference sign P in FIG. 4A) using the carrier gas CG through the welding material supply path 25.

The welding material 26 supplied to the laser irradiation position P is melted by applying a strong heat energy using the laser beam L. When the melted welding material 26 is solidified, the build-up layer 134 is formed. When the welding torch 21 is moved at a constant speed along the surface of the disc main body 133 at the same time as the radiation of the laser beam L and the supply of the welding material 26, it is possible to form the build-up layer 134 having a constant thickness on the surface of the disc main body 133. As described above, when the welding torch 21 is reciprocally moved a plurality of times, it is possible to laminate the build-up layer 134 having a multilayer structure on the surface of the disc main body 133.

Meanwhile, in the LMD welding apparatus 20, the amount of heat input to the disc main body 133 is small, and heat is generated due to the laser beam L which is supplied from the laser oscillator (not shown) and is radiated on the disc main body 133. In order to obtain a necessary molten amount using the above-described heat, it is necessary to appropriately set the laser beam diameter of the laser beam L and the movement speed of the laser beam L.

Here, the welding conditions of the LMD welding apparatus 20 will be described with reference to FIG. 5.

As shown in FIG. 5, as the laser radiation conditions, the focal diameter of the laser beam L is set to 5.4 [mm], the set voltage value of a manual focusing optics (MFO), which is a device that adjusts the focal distance of the laser beam L, is set to 0.45 [V], and the output of the laser beam L is set to 2700 [W]. As the welding material supply conditions, the flow rate of the shield gas SG is set to 15 [L/min], the rotation speed of the welding torch 21 is set to 10 [rpm], and the flow rate of the carrier gas CG is set to 4 [L/min]. As other conditions, the welding rate (the movement speed of the welding torch 21) is set to 500 [mm/min], and the pitch width is set to 2.3 [mm].

Figure 4B:
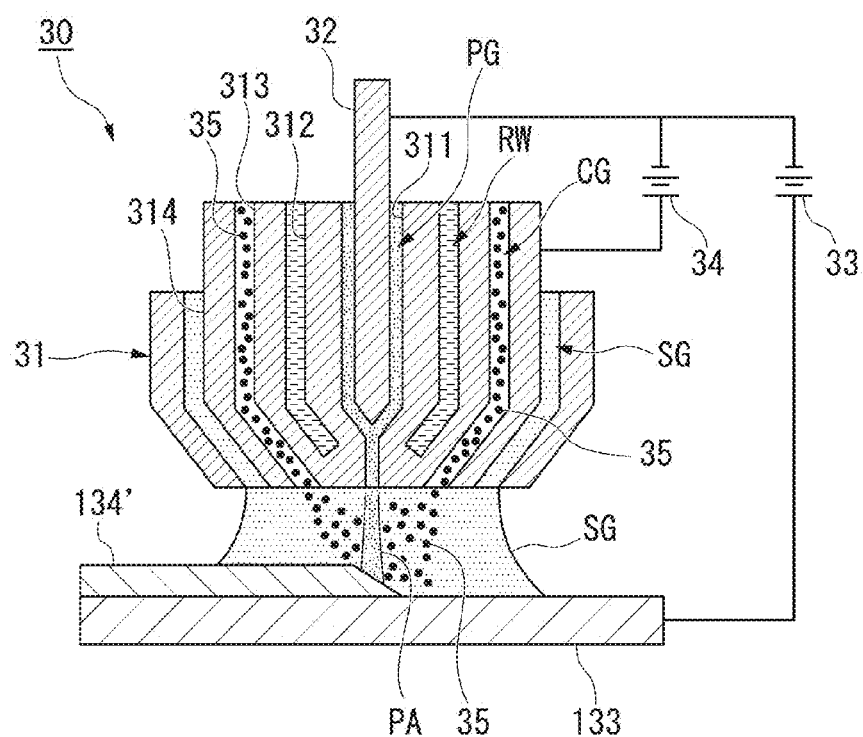
FIG. 4B is a schematic constitutional view of a PTA welding apparatus of the related art.

Meanwhile, as shown in FIG. 4B, the PTA welding apparatus 30 mentioned as a comparative example includes a welding torch 31, a tungsten electrode 32 inserted into the central part of the welding torch 31, a main power supply 33 connected to the tungsten electrode 32 and the disc main body 133, and a pilot power supply 34 connected to the tungsten electrode 32 and the welding torch 31.

As shown in FIG. 4B, an electrode hole 311 is formed in the central part of the welding torch 31, and a first flow path 312, a second flow path 313, and a third flow path 314 are formed in a concentric shape around the electrode hole 311. The tungsten electrode 32 is inserted into the electrode hole 311, and a pilot gas PG is supplied. Cooling water RW is supplied to the first flow path 312. A welding material 35 and a carrier gas CG are supplied to the second flow path 313. A shield gas SG is supplied to the third flow path 314. Meanwhile, the welding material 35 is a powder mixture of matrix particles and high-melting-point metal particles.

In the PTA welding apparatus 30 constituted as described above, when voltage is applied between the tungsten electrode 32 and the welding torch 31 using the pilot power supply 34, arc discharge is generated in the electrode hole 311, and thus the pilot gas PG turns into plasma. When the pilot gas PG that has turned into plasma (plasma gas) is cooled using the cooling water RW supplied to the first flow path 312, the pilot gas is thinly squeezed due to a so-called thermal pinch effect. As a result, the plasma gas is sprayed toward the disc main body 133 from a tip hole of the electrode hole 311 as a plasma arc PA having a high energy density. When the plasma arc PA reaches the disc main body 133, voltage is applied between the tungsten electrode 32 and the disc main body 133 using the main power supply 33, and thus an arc current (not shown) flows into the disc main body 133. As a result, a molten pool is formed on the surface of the disc main body 133. Meanwhile, the welding material 35 supplied to the second flow path 313 is pneumatically sent into the plasma arc PA using the carrier gas CG and is melted. When the welding material 35 in a molten state is injected into the molten pool on the disc main body 133, a build-up layer 134' is formed.

FIG. 6 shows the characteristic comparison results between LMD welding that is carried out using the LMD welding apparatus 20 shown in FIG. 4A, PTA welding that is carried out using the PTA welding apparatus 30 shown in FIG. 4B, and plasma thermal spraying that is mentioned as another comparative example.

As shown in FIG. 6, in a case in which LMD welding is employed, compared with PTA welding, the build-up thickness and the build-up amount are small, but the thermal load is low, and thus the amount of carbon molten into the build-up layer from the disc main body is small. In addition, in a case in which LMD welding is employed, compared with plasma thermal spraying, the adhering force between the disc main body and the build-up layer is strong.

In addition, in a case in which LMD welding is employed, compared with plasma thermal spraying, the yield is high. Furthermore, although the porosity (welding defect) in plasma thermal spraying is in a range of 1% to 3%, the porosity in LMD welding is 0%.

Next, the relationship between the distance [mm] from the surface layer (surface) of the build-up layer and Vickers hardness [Hv] will be described with reference to FIG. 7. Meanwhile, in FIG. 7, the Vickers hardness was measured using a test specimen having a width of 50 [mm], a length of 150 [mm], and a thickness of 19 [mm].

Figure 7:
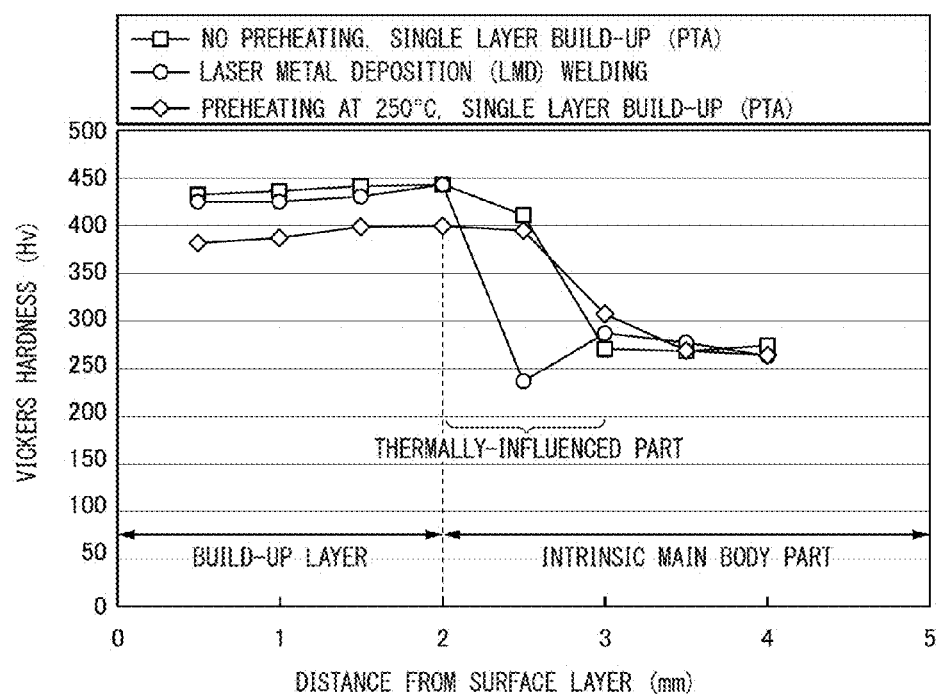
FIG. 7 is a graph showing a relationship between the distance from a surface layer of the build-up layer and Vickers hardness.

FIG. 7 is a graph showing the relationship between the distance [mm] from the surface layer of the build-up layer and Vickers hardness [Hv]. The horizontal axis of FIG. 7 indicates the distance from the surface layer of the build-up layer in the thickness direction, and the vertical axis of FIG. 7 indicates Vickers hardness.

Meanwhile, round plots (○) in FIG. 7 indicate a case in which the first build-up layer is laminated on the disc main body using LMD welding. In addition, square plots (□) indicate a comparative example in which the first build-up layer is laminated using PTA welding without preheating the disc main body. Rhombic plots (◇) indicate a comparative example in which the first build-up layer is laminated using PTA welding after preheating the disc main body to 250° C.

In addition, in FIG. 7, the "thermally-influenced part" refers to a depth range of approximately 2.8 [mm] from the surface of the disc main body which is thermally influenced during welding. In addition, the "intrinsic main body part" refers to the entire part of the disc main body in the thickness direction.

As shown in FIG. 7, when LMD welding and PTA welding are compared with each other, in the region of the thermally-influenced part, a greater Vickers hardness is obtained in PTA welding than in LMD welding.

The reason therefor is that, in a case in which the build-up layer is formed using PTA welding, a quenched layer is generated in the disc main body due to an extremely high thermal influence, and thus the hardness of the disc main body increases. In contrast, in a case in which the build-up layer is formed using LMD welding, the thermal influence of LMD welding is weak, and the disc main body is thermally influenced only to an appropriate extent. Therefore, in a case in which the build-up layer is formed using LMD welding, the disc main body maintains high toughness.

In addition, in a case in which the build-up layer is formed using LMD welding, the Vickers hardness in a depth of 2 [mm] or more from the surface layer of the build-up layer is below 350 [Hv], which is considered as a general rough standard determining whether or not cracks initiate and propagate. Therefore, in a case in which the build-up layer is formed using LMD welding, in the disc main body, cracking or distortion does not easily occur.

Figure 8:
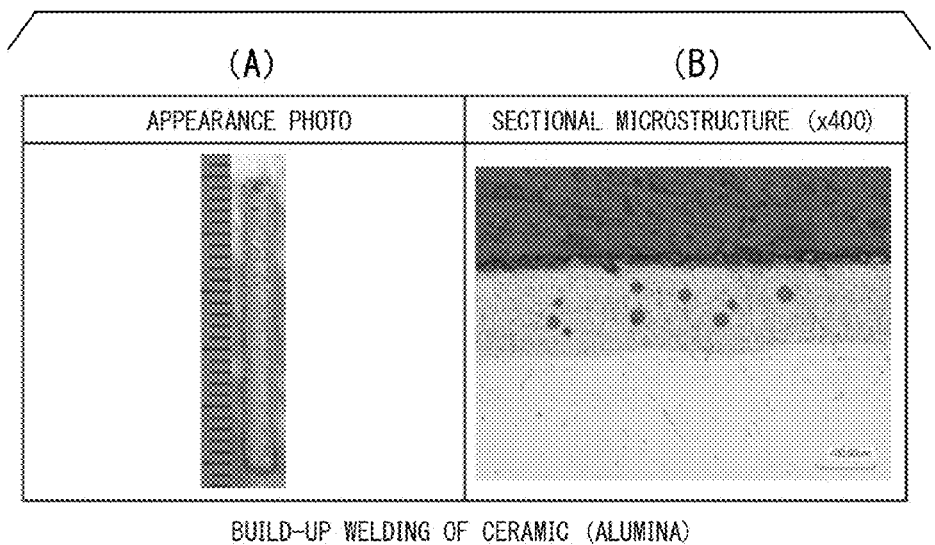
FIG. 8 shows a photo of the appearance of the build-up layer (A) seen from above and a cross-sectional microphoto of the build-up layer (B).
Figure 9:
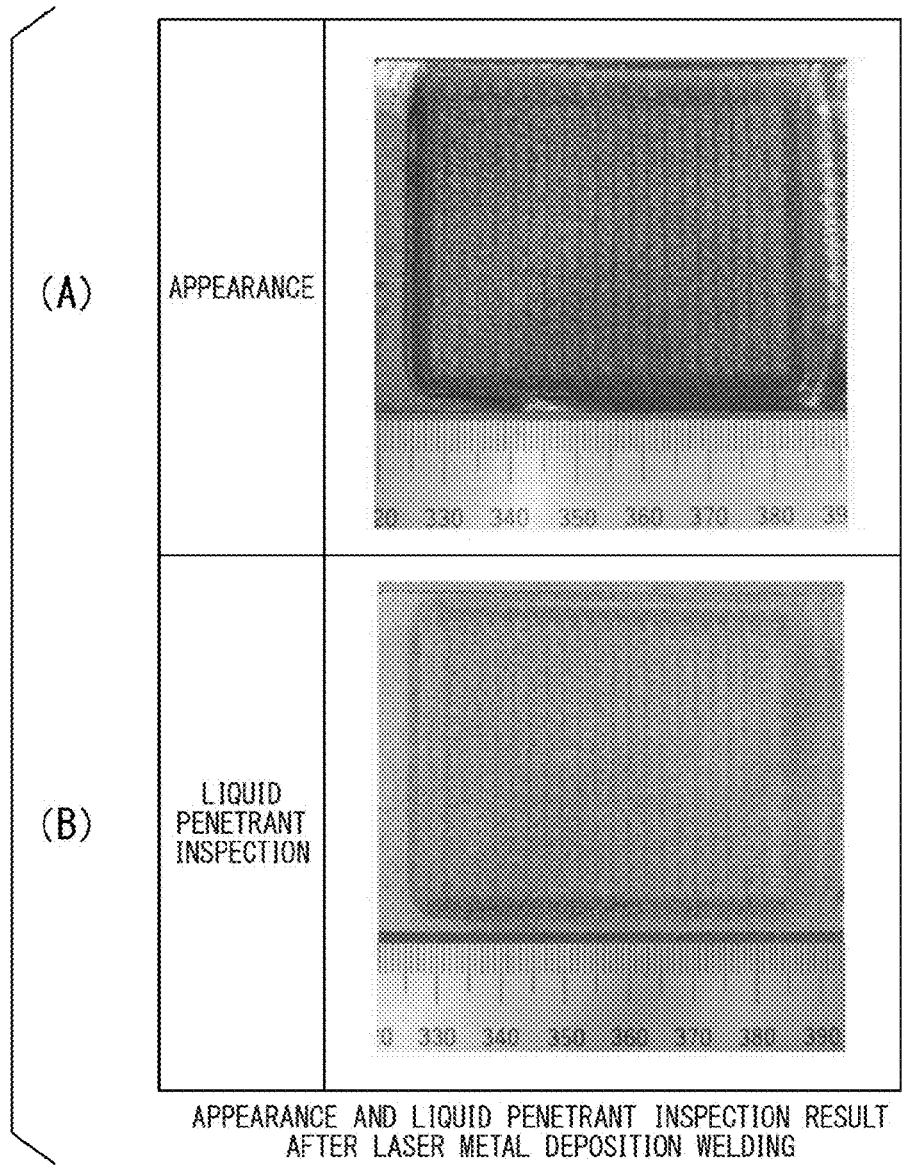
FIG. 9 shows a photo of the appearance of the build-up layer (A) and a photo showing the liquid penetrant inspection result of the surface of the build-up layer (B).

FIG. 8A shows a photo of the appearance of the build-up layer 134 formed on the surface of the disc main body 133 using the LMD welding apparatus 20 which is seen from above. FIG. 8B shows a cross-sectional microphoto of the build-up layer 134. FIG. 9A shows a photo of the appearance of the surface of the build-up layer 134. FIG. 9B shows the liquid penetrant inspection result of the build-up layer 134.

As shown particularly in FIGS. 8B and 9B, in the brake disc 13 manufactured using LMD welding, as the metallographic structures of the cross-section and the surface of the build-up layer 134, uniform integrated structures with no microstructural changes are formed due to melt bonding by means of LMD welding.

Next, a method for manufacturing the brake disc 13 according to the present embodiment will be described.

Figure 10:
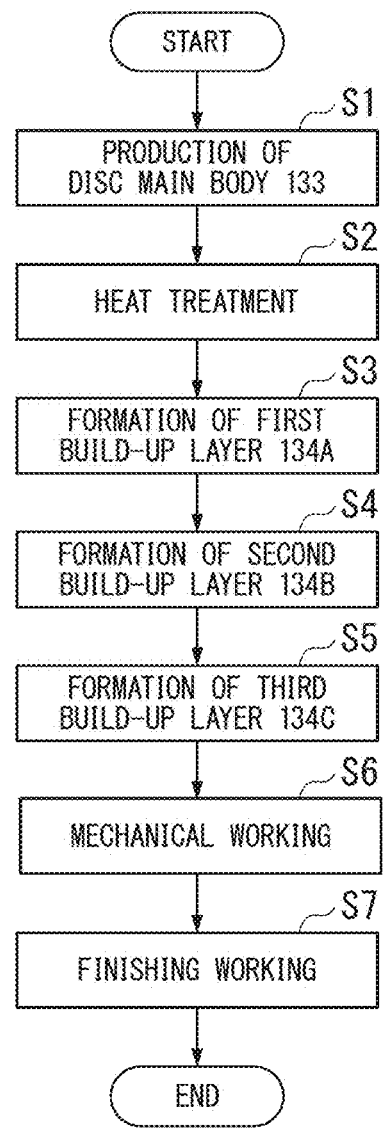
FIG. 10 is a flowchart showing a manufacturing method of a brake disc according to an embodiment of the present invention.

FIG. 10 is a flowchart showing a manufacturing step of the brake disc 13 according to the present embodiment. First, the disc main body 133 is produced (Step S1). In Step S1, an ingot having a predetermined composition is forged, rolled, or cast, thereby producing the disc main body 133.

Next, if necessary, a heat treatment of the disc main body 133 is carried out (Step S2). In Step S2, a heat treatment of the disc main body 133 is carried out so as to obtain desired characteristics of the disc main body 133 produced in Step S1, thereby adjusting the structure of the disc main body 133.

Meanwhile, in a case in which PTA welding of the related art is employed, mechanical working is carried out on the disc main body 133 after Step S2. That is, in a case in which PTA welding is employed, the disc main body 133 is significantly thermally influenced. Therefore, after predicting the amount of strain generated in the disc main body 133 in advance, it is necessary to form a groove part having a predetermined angle in the disc main body 133 by cutting out a part of the surface of the disc main body 133 so that the build-up layer 134 after welding falls into an appropriate condition.

However, in the present embodiment, since LMD welding having a small thermal influence on the disc main body 133 unlike in PTA welding is employed, it is not necessary to carry out the above-described mechanical working on the disc main body 133.

Next, the first build-up layer 134A is formed on the surface of the disc main body 133 using the LMD welding apparatus 20 (Step S3: corresponding to a first step of a build-up layer-forming step in the present invention). In Step S3, the welding material 26 (the first metal powder) is melted by radiating the laser beam L on the surface of the disc main body 133 and supplying the welding material 26 to the position P irradiated with the laser beam L using the LMD welding apparatus 20, and the first build-up layer 134A is formed on the surface of the disc main body 133.

The welding material 26 (the first metal powder) in Step S3 is the particle-formed (powder-formed) matrix 136 made of, for example, a nickel-based alloy.

Next, the second build-up layer 134B is formed on the surface of the first build-up layer 134A using the LMD welding apparatus 20 (Step S4: corresponding to a second step of the build-up layer-forming step in the present invention). In Step S4, the second build-up layer 134B is formed on the surface of the first build-up layer 134A by radiating the laser beam L on the surface of the first build-up layer 134A and supplying the welding material 26 (the second metal powder) to the position P irradiated with the laser beam L so as to melt the welding material 26 using the LMD welding apparatus 20.

The welding material 26 (the second metal powder) in Step S4 is a powder mixture of particles of the matrix 136 (for example, a nickel-based alloy), the high-melting-point metal particles 137 (for example, molybdenum), and the hard ceramic particles 138 (for example, alumina).

The amount of the hard ceramic particles 138 in the welding material 26 (the second metal powder) is higher than 0% and 50% or lower in terms of % by mass. When the above-described welding material 26 is used, the amount of the hard ceramic particles 138 in the second build-up layer 134B also becomes higher than 0% and 50% or lower in terms of % by mass.

Next, the third build-up layer 134C is formed on the surface of the second build-up layer 134B using the LMD welding apparatus 20 (Step S5: corresponding to the second step of the build-up layer-forming step in the present invention). In Step S5, the third build-up layer 134C is formed on the surface of the second build-up layer 134B by radiating the laser beam L on the surface of the previously-formed second build-up layer 134B and supplying the welding material 26 made of the same second metal powder as above to the position P irradiated with the laser beam L using the LMD welding apparatus 20 so as to melt the welding material 26. Since the second build-up layer 134B and the third build-up layer 134C are melt-bonded with each other, the metallographic structure becomes uniform in the second build-up layer 134B and the third build-up layer 134C as a whole (refer to FIG. 3).

Meanwhile, when the third build-up layer 134C is formed on the surface of the second build-up layer 134B by means of LMD welding, the proportion of the high-melting-point metal particles 137 in the welding material 26 (the second metal powder) may be increased. In such a case, the heat-resisting properties of the surface of the third build-up layer 134C (that is, the friction surface 135 into which the brake pad 14 comes into direct contact) can be further improved.

Next, mechanical working of the brake disc 13 obtained by forming the build-up layer 134 on the surface of the disc main body 133 is carried out (Step S6). In Step S6, the outer form of the brake disc 13 is adjusted to be a desired outer form by means of cutting or the like.

Finally, finishing working of the brake disc 13 is carried out (Step S7). In Step S7, the friction surface 135 of the brake disc 13 is polished so that the friction surface 135 (the surface of the third build-up layer 134C) becomes a flat surface. When the respective steps described above (Steps S1 to S7) are carried out, the brake disc 13 is completed, and the manufacturing step of the brake disc 13 ends.

As described above, in the present embodiment, since the build-up layer 134 is laminated on the disc main body 133 using LMD welding having a smaller thermal influence than PTA welding of the related art, preheating which has been required in PTA welding of the related art is unnecessary, and thermal strain generated during welding is suppressed, and thus it is possible to suppress the strain distortion of the disc main body 133. As a result, according to the present embodiment, the thickness of the disc main body 133 can be reduced.

In addition, in the present embodiment, since LMD welding having a smaller thermal influence than PTA welding is used, it is also possible to prevent the disc main body 133 from melting into the build-up layer 134. As a result, according to the present embodiment, the degradation of the strength and functionality of the build-up layer 134 can be prevented. In addition, since it is also possible to suppress the generation of poor welding results such as beads, blow-holes, or pits having irregular shapes in the build-up layer 134, it becomes possible to further prevent a decrease in the strength of the build-up layer 134.

In addition, in the present embodiment, since the build-up layer 134 is laminated on the disc main body 133 using LMD welding having a smaller thermal influence than PTA welding, it is possible to use ceramic particles having a relatively low melting point (for example, alumina) as the particles that are dispersed in the build-up layer 134.

In addition, in the present embodiment, since the first build-up layer 134A initially formed on the disc main body 133 is a nickel-based alloy layer not including any high-melting-point metal particles 137, it is possible to enhance adhesion between the build-up layer 134 and the disc main body 133. In addition, since the high-melting-point metal particles 137 in the second build-up layer 134B and the third build-up layer 134C have a high melting point, the high-melting-point metal particles remain in the second layer 134B and the third layer 134C even after welding as metal particles. Therefore, it is possible to impart strong heat-resisting properties to the disc main body 133 and to prevent the build-up layer 134 from cracking after welding.

Furthermore, in the present embodiment, the welding material 26 obtained by dispersing the high-melting-point metal particles 137 having a higher melting point than the disc main body 133 is laminated on the surface of the disc main body 133 that is attached to the wheel 11 (rotary body) integrally rotating with the axle by means of LMD welding. According to the present embodiment, quenching of the disc main body 133 due to friction heat generated during braking while travelling is suppressed due to the build-up layer 134 formed on the disc main body 133 using LMD welding, and thus it is possible to suppress the generation of cracking or distortion on the surface of the disc main body 133 and to impart both heat-resisting properties and thermal crack resistance to the brake disc 13.

Hitherto, the embodiment of the present invention has been described in detail with reference to the accompanying drawings, but the present invention is not limited to the embodiment, and the embodiment may be modified within the scope of the gist of the present invention.

INDUSTRIAL APPLICABILITY

The present invention relates to a brake disc which has a friction surface on which a brake pad is pressed and is capable of preventing thermal strain and the resulting distortion generated during welding, and a manufacturing method therefor.

BRIEF DESCRIPTION OF THE REFERENCE SYMBOLS

10: SHINKANSEN BRAKING APPARATUS
11: WHEEL
12: AXLE
13: BRAKE DISC
14: BRAKE PAD
20: LMD WELDING APPARATUS
21: WELDING TORCH
22: CENTRAL HOLE
23: COOLING WATER SUPPLY PATH
24: SHIELD GAS SUPPLY PATH
25: WELDING MATERIAL SUPPLY PATH
26: WELDING MATERIAL
133: DISC MAIN BODY
134: BUILD-UP LAYER
134A: FIRST BUILD-UP LAYER (INNER LAYER)
134B: SECOND BUILD-UP LAYER (OUTER LAYER)
134C: THIRD BUILD-UP LAYER (OUTER LAYER)
135: FRICTION SURFACE
136: MATRIX
137: HIGH-MELTING-POINT METAL PARTICLE
138: HARD CERAMIC PARTICLE
L: LASER BEAM

The invention claimed is:
1. A brake disc that stops rotation of an axle when a brake pad is pressed on a surface of the brake disc, comprising:
   a disc main body that is attached to a rotary body integrally rotating with the axle;
   a plurality of build-up layers laminated on a surface of the disc main body; and
   the disc main body being made of steel,
   wherein the build-up layers are laminated on the surface of the disc main body by means of laser metal deposition welding,
      the build-up layer is constituted of a laminate formed of two or more layers of a predetermined matrix laminated on the surface of the disc main body,
   the laminate includes an inner layer which is laminated on the disc main body and does not include high-melting-point metal particles having a higher melting point than the disc main body and an outer layer which is formed on the inner layer and includes the high-melting-point metal particles, the outer layer of the build-up layer includes ceramic particles, and a molten amount into the build-up layer from the disc main body is <5%.

2. The brake disc according to claim 1,
wherein the high-melting-point metal particles include molybdenum, tungsten, niobium, or tantalum, or a combination thereof.

3. The brake disc according to claim 2,
wherein an amount of the ceramic particles in the outer layer is higher than 0% and lower than or equal to 50% in terms of % by mass.

4. The brake disc according to claim 1,
wherein an amount of the ceramic particles in the outer layer is higher than 0% and lower than or equal to 50% in terms of % by mass.

5. A manufacturing method of a brake disc that stops rotation of an axle when a brake pad is pressed on a surface of the brake disc, comprising:

a build-up layer-forming step of forming a build-up layer on a surface of a disc main body that is attached to a rotary body integrally rotating with the axle by means of laser metal deposition welding, the disc main body being made of steel, wherein the build-up layer-forming step includes a first step of forming an inner layer of the build-up layer on the surface of the brake main body by radiating laser beams on the surface of the disc main body and supplying a first metal powder to a position irradiated with the laser beams so as to melt the first metal powder; and a second step of forming an outer layer of the build-up layer on a surface of the inner layer by radiating laser beams on the surface of the inner layer and supplying a second metal powder to a position irradiated with the laser beams so as to melt the second metal powder, wherein the first metal powder is particles of a matrix which does not include high-melting-point metal particles having a higher melting point than the disc main body, and the second metal powder is a powder mixture of the particles of the matrix and the high-melting-point metal particles.

6. The manufacturing method of a brake disc according to claim 5,
wherein the high-melting-point metal particles include molybdenum, tungsten, niobium, or tantalum, or a combination thereof.

7. The manufacturing method of a brake disc according to claim 6,
wherein the second metal powder is a powder mixture of the particles of the matrix, the high-melting-point metal particles, and ceramic particles; and
an amount of the ceramic particles in the second metal powder is higher than 0% and lower than or equal to 50% in terms of % by mass.

8. The manufacturing method of a brake disc according to claim 5,
wherein the second metal powder is a powder mixture of the particles of the matrix, the high-melting-point metal particles, and ceramic particles; and
an amount of the ceramic particles in the second metal powder is higher than 0% and lower than or equal to 50% in terms of % by mass.

* * * * *